United States Patent [19]

Mao

[11] Patent Number: 5,098,507
[45] Date of Patent: Mar. 24, 1992

[54] RELIEVED PLASTIC FLOOR TILE ROLLING PRESS WITH AN AUTOMATIC ALIGNMENT DEVICE

[76] Inventor: Chen-Chi Mao, 25 Angela Ct., Woodcliff Lake, N.J. 07675

[21] Appl. No.: 647,307

[22] Filed: Jan. 28, 1991

[51] Int. Cl.$^5$ ............................................. B32B 31/16
[52] U.S. Cl. ..................................... 156/351; 156/209; 156/277; 156/361; 156/580; 156/581; 156/582; 226/2; 226/3; 226/15; 226/16; 226/18; 226/19; 226/20; 226/24; 226/28; 226/29; 226/38; 226/40; 226/42; 226/43; 226/45
[58] Field of Search ............... 156/209, 277, 351, 361, 156/580, 581, 582; 226/2, 3, 15, 16, 18, 19, 20, 24, 28, 29, 38, 40, 42, 43, 45, 195

[56] References Cited
U.S. PATENT DOCUMENTS

| | | | |
|---|---|---|---|
| 2,205,255 | 6/1940 | Gulliksen | 226/2 |
| 3,048,621 | 4/1963 | Guastavino | 156/351 |
| 3,559,568 | 2/1971 | Stanley | 226/28 |
| 3,806,012 | 4/1974 | Roch | 226/28 |
| 4,067,760 | 1/1978 | Nelson | 156/361 |
| 4,312,686 | 1/1982 | Smith et al. | 156/209 |
| 4,612,074 | 9/1986 | Smith et al. | 156/209 |

*Primary Examiner*—Caleb Weston
*Attorney, Agent, or Firm*—Ladas & Parry

[57] ABSTRACT

A relieved plastic floor tile rolling press having an automatic alignment device comprising a surface roller from which a surface substratum with plane patterns printed thereon is unwound, a pressing roller on which recessed carves shaped the same as the plane patterns are formed to form relieved patterns on the plastic tile, and a sensing device to detect the lateral deviation and also detect the longitudinal location of the surface substratum. The sensing device also comprises a sensor to detect the rotational location of the pressing roller. The information detected by the sensing device is then sent to microprocessors to adjust the lateral location of the surface substratum and eliminate the difference between the longitudinal location of the surface substratum and the rotational location of the pressing roller.

2 Claims, 2 Drawing Sheets

RELIEVED PLASTIC FLOOR TILE ROLLING PRESS WITH AN AUTOMATIC ALIGNMENT DEVICE

FIELD OF THE INVENTION

The present invention relates generally to a relieved plastic floor tile manufacturing apparatus and in particular to one having an automatic alignment device to correct the deviation and misalignment occurring in pressing the floor tile.

BACKGROUND OF THE INVENTION

Generally speaking, plastic floor tile comprises two groupings. One only has plane patterns printed thereon and the other has a relieved surface for forming the printed patterns. The latter is obviously more beautiful than the former. However, it is very hard to have the relieved patterns in exact alignment with the printed patterns during the process of pressing. The misalignment of the patterns results in a poor quality and bad-looking floor tile.

In general, the process of making plastic floor tile includes solidifying the base materials by steaming, breaking the solidity to pieces, heating and rolling to desired thickness, pressing to bond the surface substratum and the base together, and cooling and cutting to desired size and shape. It is at the process of pressing the surface and the base together that the misalignment occurs. To overcome the misalignment, it is necessary to adjust the orientation and speed of the surface substratum on which the plane patterns are printed so as to have the recessed carving formed on a pressing roller exactly match the plane patterns.

OBJECTS OF THE INVENTION

It is therefore the object of the invention to provide a relieved plastic floor tile rolling press with an automatic alignment device which can adjust the relative position of the surface substratum to the pressing roller so that when the surface substratum and the base are pressed together and the relieves are formed by the pressing roller, the relieved patterns exactly align with the plane patterns printed on the surface substratum.

To achieve the object, there is provided a relieved plastic floor tile rolling press having an automatic alignment device. The rolling press comprises a surface roller from which a surface substratum with plane patterns printed thereon is unwound, a pressing roller on which recessed carves shaped the same as the plane patterns are formed to form relieved patterns on the tile, and a sensing device to detect the lateral deviation and also detect the longitudinal location of the surface substratum. The sensing device also comprises a sensor to detect the rotational location of the pressing roller. This information detected by the sensing device is then sent to microprocessors to adjust the lateral location of the substratum and eliminate the difference between the longitudinal location of the surface substratum and the rotational location of the pressing roller.

BRIEF DESCRIPTION OF THE DRAWINGS

The above object, as well as other aspects, of the invention will be readily ascertained from the more detailed description of the preferred embodiment of the invention which follows, reference being had to the attached drawings, in which.

DETAILED DESCRIPTION OF THE PREFERRED EMBODIMENT

Figure 1:
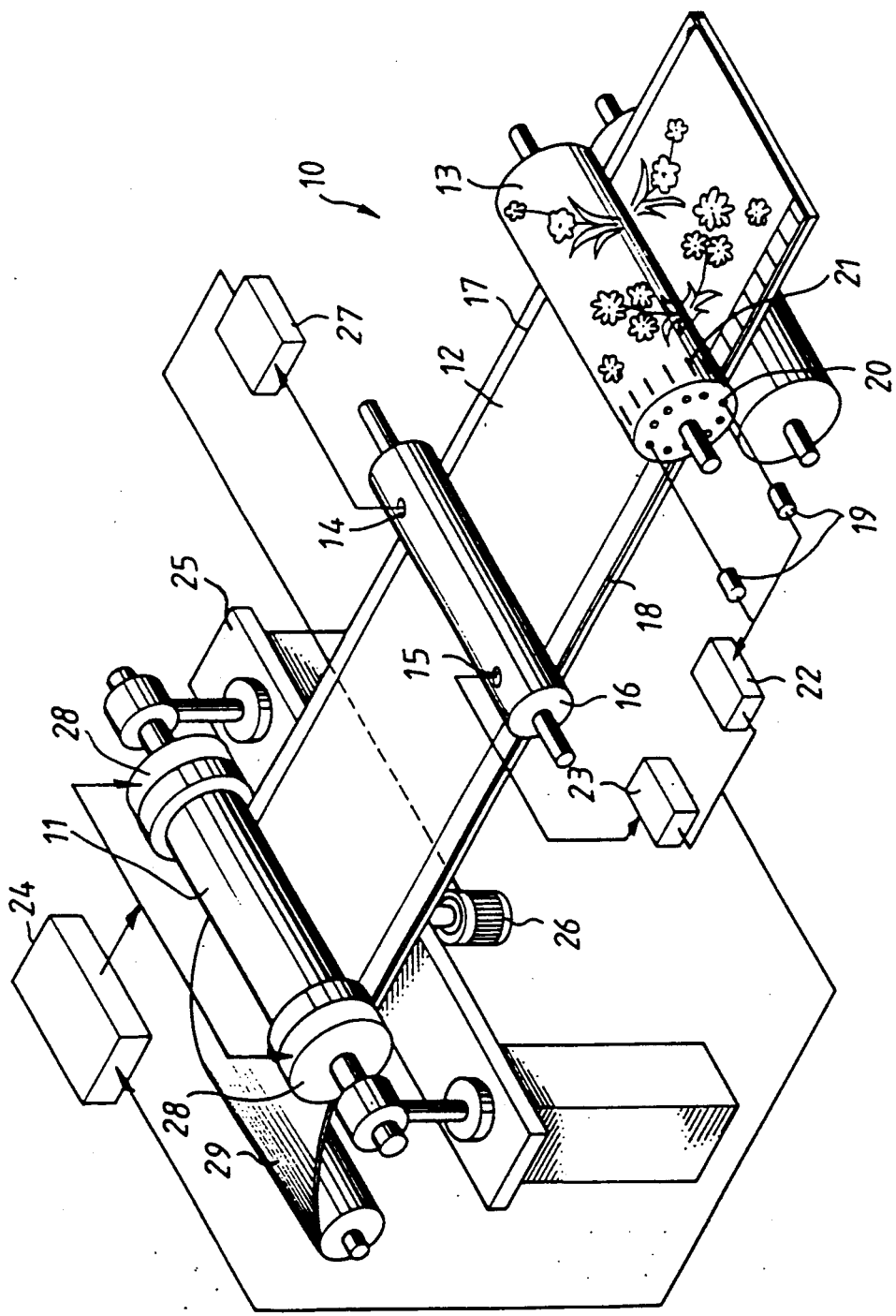
FIG. 1 is a schematic view of the relieved plastic floor tile rolling press with an automatic alignment device in accordance with the present invention.
Figure 2:
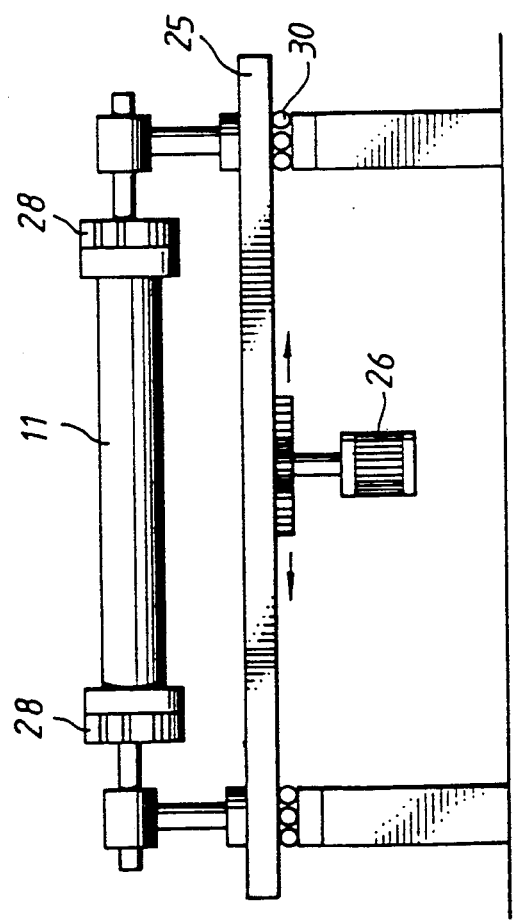
FIG. 2 is a schematic view of the mechanism to laterally adjust the surface roller.

With reference to the drawings, the relieved plastic floor tile rolling press in accordance with the present invention, generally designated by reference numeral 10, comprises a surface roller 11 around which an elongated sheet of surface substratum 12 with plane patterns printed thereon is wound, a pressing roller 13 which has a recessed pattern similar to the plane patterns formed thereon, and a sensing device comprising a lateral deviation sensor 14 and a longitudinal location sensor 15, both of which are disposed on a third roller 16 passively following the movement of the surface substratum 12 so that the sensors 14 and 15 can detect the lateral deviation and the longitudinal location of the surface substratum by sensing a reference line 17 and a series of longitudinally-disposed and equally-spaced sense lines 18 printed on the surface substratum 12.

The sensing device further comprises a rotational location sensor 19 which detects a plurality of sensing points 20 equally spaced around a phantom circle on one end of the pressing roller 13 and a plurality of sense lines 21 disposed around the same end of the pressing roller 13. The outputs of the rotational location sensor 19 are sent to a first memory and calculation element 22 and then compared with the data stored in a second memory and calculation element 23 which stores the information obtained from the longitudinal location sensor 15 so as to determine the difference between the longitudinal location of the surface substratum 12 and the rotational location of the pressing roller 13. This comparison is done and handled by a central microprocessor 24.

To adjust the surface substratum 12 in response to the detected deviation and difference, a support 25 on which the surface roller 11 is fixed is laterally slidable (for example disposed on rollers or balls 30) on a plane generally parallel with the tile surface 12 under the actuation of a motor 26 which is controlled by a microprocessor 27. The microprocessor 27 receives signals from the lateral deviation sensor 16, processes the signals and then sends out commands to the motor 26 to eliminate the lateral deviation of the surface substratum 12.

In order to adjust the difference between the longitudinal location of the surface substratum 12 and the rotational location of the pressing roller 13, an electro-magnetic brake 28 is disposed at each end of the surface roller 11. These brakes 28 are controlled by the central microprocessor 24 to generate magnetic forces and apply these forces on the surface roller 11 to retard it so as to adjust the speed thereof. As a result, the longitudinal feed of the surface substratum 12 is adjusted to match the rotational speed of the pressing roller 13.

To conclude, the plastic floor tile which is constituted by a base substratum 29 (and may include an intermediate laminar bond thereon) and the surface substratum 12 is fed through the surface roller 11, passing through the third roller 16 at which lateral deviation and longitudinal location of the plastic floor tile are detected by the lateral deviation sensor 14 and the longitudinal location sensor 15 with the help of the reference line 17 and the sense lines 18 printed on the surface substratum 12, and finally pressed together by the pressing roller 13 forming the relieved patterns. The rotational location of the pressing roller 13 is detected by the rotational location sensor 19 with the help of the sensing points 20 and the sense lines 21 disposed on the pressing roller. The information of the longitudinal location of the surface substratum 12 and the rotational location of the pressing roller 13 are respectively stored in the first and second memory and calculation elements 23 and 22 and compared by the central microprocessor 24 which in turn issues commands to control the electro-magnetic brakes 28 so as to adjust the speed of the surface roller 11. The information of lateral deviation detected by the lateral deviation sensor 14 is processed by the microprocessor 27 to control the motor 26 so as to laterally move the support 25 to eliminate the lateral deviation.

It should be apparent that although the invention has been described in connection with the preferred embodiment, it is contemplated that those skilled in the art may make changes to certain features of the preferred embodiment without altering the overall basic function and concept of the invention and without departing from the spirit and scope of the invention, as defined in the appended claims.

I claim:

1. A relieved plastic floor tile rolling press with an automatic alignment device, wherein said plastic floor tile is constituted by a base substratum including an intermediate laminar and a surface substratum having plane patterns printed thereon, said rolling press comprising:
   a surface roller which, with said surface substratum having a reference line and a plurality of longitudinally-disposed and equally-spaced sense lines printed thereon and wound therearound, is fixed on a laterally slidable support and has at each end thereof an electro-magnetic brake disposed to control the speed thereof and thus the unwinding speed of said surface substratum;
   a pressing roller which has carved figures with the same pattern as the plane pattern formed thereon to form relieved patterns on said substratums and a plurality of sense lines disposed around one end thereof and a plurality of sensing points disposed around a phantom circle on the same end of said pressing roller so as to be detected by a rotational location sensor;
   a sensing device which comprises a lateral deviation sensor to sense said reference line and a longitudinal location sensor to detect said sense lines printed on said surface substratum;
   a first microprocessor which receives deviation signal from said lateral deviation sensor when said base substratum and said surface substratum are fed through said surface roller and said pressing roller and said reference line is detected by said lateral deviation sensor and then sends commands to actuate a motor to laterally move said slidable support so as to eliminate the lateral deviation of said surface substratum; and
   a second microprocessor which receives signals from a first memory and calculation element, which receives outputs from said rotational location sensor and processes and stores the outputs, and a second memory and calculation element, which receives outputs from said longitudinal location sensor and processes and stores the outputs, and compares said signals to obtain the difference between the rotational location of said pressing roller and the longitudinal location of said surface substratum so as to control the speed of said surface roller and thus the unwinding speed of said surface substratum by energizing and de-energizing said electro-magnetic brakes to match the rotational speed of said pressing roller and thus making the plane patterns printed on said surface substratum exactly match said carved patterns formed on said pressing roller.

2. A relieved plastic floor tile rolling press with an automatic alignment device as claimed in claim 1 wherein said slidable support is disposed on a plurality of rollers.

* * * * *